US007730544B2

(12) United States Patent
Volp (10) Patent No.: US 7,730,544 B2
(45) Date of Patent: Jun. 1, 2010

(54) PRIVILEGED EXECUTION CONTEXT RESTRICTING USE OF HARDWARE RESOURCES BY OTHER EXECUTION CONTEXTS

(75) Inventor: Marcus Volp, Dresden (DE)

(73) Assignee: STMicroelectronics SA, Montrouge (FR)

( * ) Notice: Subject to any disclaimer, the term of this patent is extended or adjusted under 35 U.S.C. 154(b) by 1229 days.

(21) Appl. No.: 10/959,716

(22) Filed: Oct. 6, 2004

(65) Prior Publication Data

US 2005/0081020 A1    Apr. 14, 2005

(30) Foreign Application Priority Data

Oct. 8, 2003   (FR)   .................................. 03 11757

(51) Int. Cl.
*G06F 7/04*     (2006.01)
*G06F 17/30*    (2006.01)
*H04N 7/16*     (2006.01)
(52) U.S. Cl. .......................................... 726/27; 726/26
(58) Field of Classification Search .................. 726/27, 726/26
See application file for complete search history.

(56) References Cited

U.S. PATENT DOCUMENTS

| | | | | | |
|---|---|---|---|---|---|
| 4,569,018 | A | * | 2/1986 | Hummel et al. | 711/207 |
| 5,148,544 | A | * | 9/1992 | Cutler et al. | 710/261 |
| 5,179,702 | A | * | 1/1993 | Spix et al. | 718/102 |
| 5,247,629 | A | * | 9/1993 | Casamatta et al. | 711/206 |
| 5,515,538 | A | * | 5/1996 | Kleiman | 710/260 |
| 5,892,944 | A | | 4/1999 | Fukumoto et al. | 395/670 |
| 6,418,460 | B1 | * | 7/2002 | Bitar et al. | 718/108 |
| 7,024,672 | B2 | * | 4/2006 | Callender et al. | 719/321 |
| 7,254,528 | B2 | * | 8/2007 | Bowers et al. | 704/9 |
| 7,299,383 | B2 | * | 11/2007 | David et al. | 714/51 |
| 7,350,204 | B2 | * | 3/2008 | Lambert et al. | 717/172 |
| 7,577,954 | B2 | * | 8/2009 | Shiota | 718/100 |
| 2002/0083297 | A1 | | 6/2002 | Modelski et al. | 712/18 |
| 2003/0088610 | A1 | | 5/2003 | Kohn et al. | 709/107 |

FOREIGN PATENT DOCUMENTS

WO     WO 00/43878     7/2000

OTHER PUBLICATIONS

Andrew A Chien and Jay H Byun; Safe and Protected Execution for the Morph/AMRM Reconfigurable Processor; Apr. 1, 1999; Symposium on {FPGA}s for Custom Computing Machines; IEEE.*

Halfhill, T., "Arm Dons Armor: TrustZone Security Extensions Strengthen ARMv6 Architecture," *Microprocessor Report*, Aug. 25, 2003, retrieved from http://www.arm.com/miscPDFs/4136.pdf>, pp. 1-4, download date Apr. 24, 2004.

(Continued)

*Primary Examiner*—Edan Orgad
*Assistant Examiner*—James Turchen
(74) *Attorney, Agent, or Firm*—Lisa K. Jorgenson; E. Russell Tarleton; Seed IP Law Group PLLC (57) ABSTRACT

A processor architecture provides for at least two simultaneous execution contexts, hardware resources having at least one execution unit, an instruction scheduler, an interrupt controller, and memory management means, and a given privileged context from among the simultaneous execution contexts that, in a privileged mode of an operating system, commands the other processor contexts by reading from and writing to registers of other contexts.

30 Claims, 5 Drawing Sheets

OTHER PUBLICATIONS

Madon, D., et al., "Etude d'Implementation d'un Processeur du Type SMT (Simultaneous Multithreaded)," *5th Symposium sur les Architectures Nouvelles de Machines*, Rennes, Jun. 8-11, 1999, retrieved from http://lslwww.epfl.ch/pages/staff/madon/usr_pages/staff/madon/documents/sympa.pdf>, pp. 1-14, download date Apr. 13, 2004.

Marr, D., et al., "Hyper-Threading Technology Architecture and Microarchitecture," *Intel Technology Journal* 6(1):1-12, Feb. 14, 2002, retrieved from http://www.intel.com/technology/itj/2002/volumne06issue01/art01_hpyer/vol6issl_art01.pdf>, download date Apr. 13, 2004.

York, R., "A New Foundation for CPU Systems Security: Security Extensions to the ARM Architecture," May 2003, retrieved from http://www.arm.com/pdfs/TrustZone.pdf> pp. 1-8, download date Apr. 24, 2004.

* cited by examiner

PRIVILEGED EXECUTION CONTEXT RESTRICTING USE OF HARDWARE RESOURCES BY OTHER EXECUTION CONTEXTS

BACKGROUND OF THE INVENTION

1. Field of the Invention

The present invention relates to techniques for processing several simultaneous threads (known as "Simultaneous Multi-Threading", or SMT) that are implemented in processor architectures having several execution contexts (multi-context processor), such as in processor cores having several simultaneous execution contexts (known as "Simultaneous Multi-Threaded processors", or SMTs).

2. Description of the Related Art

Over the last ten years, research has been carried out to improve the paralleling of threads and the use of execution units in a processor core. Simultaneous multithreading is a well-known technique in the field of single-processor architectures, (see Patent Application US 2002/0083297) or multiprocessor architectures (see Patent Application US 2003/0088610). It makes it possible to increase the processing speed of a microprocessor, whether it has a superscalar or other architecture (that is to say whether it has several or just one execution unit). A thread is a component of a process corresponding to a sequence of elementary operations. In a processor having several simultaneous execution contexts, a thread is executed in one of the contexts of the processor. An execution context therefore designates the state of all the registers of the processor when it is allocated to a thread.

An execution context typically comprises nonprivileged registers, that is to say ones that can be accessed by the applications in user mode, and privileged registers, that is to say ones that can be accessed by the operating system (or OS) in privileged mode only. These latter comprise, in particular, configuration registers, such as the base address register of the translation table of a memory management unit (or MMU).

In a conventional SMT processor core architecture, all the simultaneous execution contexts have the same rights of access to the peripherals, to the memory, and to the registers, etc. This is why such an architecture is said to be symmetric in what follows. In fact, a process which is executed in the privileged mode of any one of the simultaneous execution contexts possesses full control of the hardware resources of the processor and can therefore in practice divert the system from its normal use.

However, a requirement has recently appeared for the secure processing of sensitive information such as a user's bank identification data (for example a bank account number or a credit card code). A requirement exists to be able to continue to execute a pre-existing operating system (known as a "Legacy OS"), such as Windows® or Linux®, and its associated application programs, while being able to oversee them in such a way that they do not jeopardize the integrity and the security of the system if a hacker were to take control of these OSs by exploiting their numerous flaws.

A trend observed in the state of the art consists in favoring an essentially hardware approach to achieve a certain level of security. According to such an approach, additional hardware make it possible to encapsulate and therefore to protect a secure domain inside the processor by effecting a hardware separation between a nonsecure mode and a secure mode. This approach is used, to mention but a few, in the Nomadik® family of multimedia application processors from STMicroelectronics, in products based on the Trustzone™ technology from ARM, or in those based on the NGSCB ("Next Generation Secure Computing Base") technology from Microsoft®.

BRIEF SUMMARY OF THE INVENTION

According to a first aspect of the invention, there is proposed a processor having at least two simultaneous execution contexts, and hardware resources having at least one execution unit, an instruction scheduler, an interrupt controller, and memory management forming part of an MMU (standing for "Memory Management Unit"). According to the invention, a given one of the simultaneous execution contexts, referred to hereinafter as the privileged context, includes, preferably in a privileged mode of the OS only, restricting the use of certain at least of the hardware resources by the other execution contexts (in user mode or in privileged mode thereof), that are referred to hereinbelow as nonprivileged contexts.

The architecture of the processor according to the invention, and which is referred to as an asymmetric architecture, enables the OS executed in the privileged context to encapsulate any subgroup of nonprivileged contexts in software and hence dynamically modifiable manner.

This asymmetric architecture enables in particular a process manipulating sensitive (from the security point of view) information to be executed in the privileged context. As a variant, such a process can be executed in a nonprivileged context which is encapsulated by virtue of command by the privileged context.

Moreover, the privileged context makes it possible, preferably in the privileged mode of the OS only, to restrict the use by the other contexts (i.e., the nonprivileged contexts) of the hardware resources of the processor. This makes it possible to strengthen security, by preventing a context executing a nonsecure code (known as "untrusted software") from being able to take control, or at the least endanger or violate the integrity of the hardware resources used in a shared manner between the contexts that execute secure codes ("trusted software") and contexts which execute nonsecure codes.

The processor can have a superscalar architecture, that is to say it has more than one execution unit, or otherwise.

A second aspect of the invention pertains to a method of managing a processor having at least two simultaneous execution contexts, and hardware resources having at least one execution unit, an instruction scheduler, an interrupt controller, and memory management. According to the invention, there is provided a specified privileged context from among the simultaneous execution contexts for restricting the use of the hardware resources by the other execution contexts, for example by reading from and/or writing to registers of the other execution contexts.

A third aspect of the invention relates to an electronic apparatus that includes a processor according to the first aspect of the invention. Such an apparatus can be a mobile telephone, and in particular a $3^{rd}$ generation telephone, a personal digital assistant, or any other portable wireless equipment. It may also be a general purpose computer, a chip card reader, a decoder box for digital television (or "Set-Top Box"), etc.

In accordance with another embodiment of the invention, a processor is provided that includes a plurality of simultaneous execution contexts; a privileged execution context; a scheduler coupled to the plurality of execution contexts and to the privileged context; an interrupt controller coupled to the plurality of execution contexts and to the privileged context; an extraction unit having a first input coupled to an output of the scheduler, a second input coupled to a memory circuit, and an output coupled to a decoder; a queue having an input coupled to an output of the decoder and an output coupled to a plurality of execution units, the execution units each having an output coupled to the privileged context, and at least one of the execution units having an input coupled to an output of the privileged context, the execution units further having their outputs coupled to the plurality of execution contexts; and wherein the privileged context is configured to read from and write to registers of the plurality of execution contexts and to restrict the use of one or more of the interrupt controller, scheduler, extraction unit, memory circuit, decoder, queue, and execution units.

BRIEF DESCRIPTION OF THE SEVERAL VIEWS OF THE DRAWING(S)

Other characteristics and advantages of the invention will become further apparent on reading the description which follows. The latter is purely illustrative and should be read in conjunction with the appended drawings in which.

In the figures, the same elements bear the same references. Moreover, the elements represented are described with reference to a figure only in so far as they have not already been presented with reference to another figure.

DETAILED DESCRIPTION OF THE INVENTION

Figure 1:
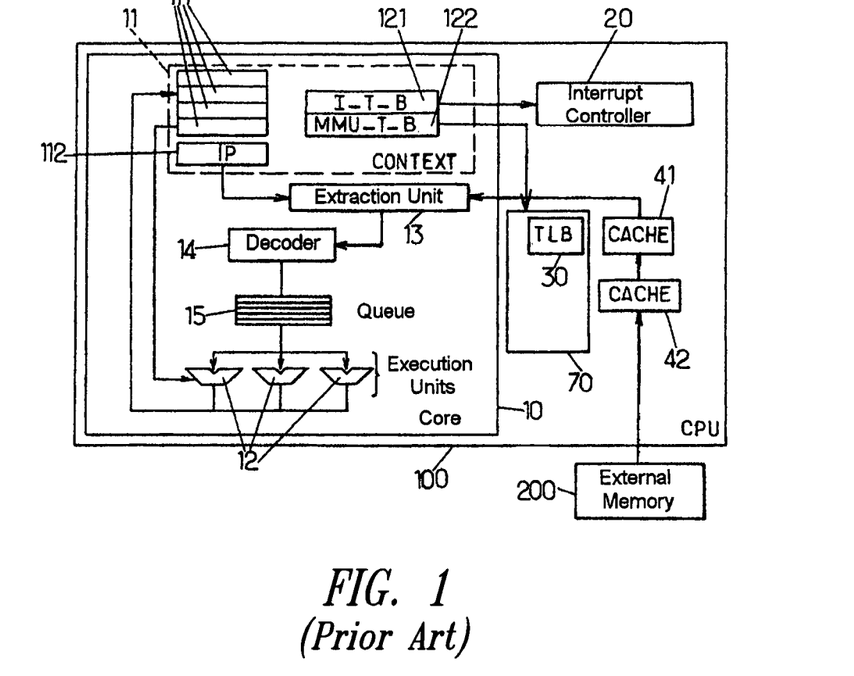
FIG. 1 is a block diagram illustrating an exemplary architecture of a single-context superscalar processor according to the prior art.

FIG. 1 gives a diagrammatic representation (block diagram) of an exemplary architecture of a processor 100 according to the prior art, and more particularly of a single-context superscalar architecture.

The processor 100 comprises a processor core 10, an interrupt controller 20, a first level cache memory 41 coupled to a second level cache memory 42, and a memory management unit (MMU) 70. The MMU 70 comprises a memory page directory 30 or TLB, (standing for "Translation Look-aside Buffer").

The function of the MMU 70, in a processor using the paged virtual memory concept, is to perform the necessary translations between virtual addresses (known to the processes executed in the core 10) and the actual addresses (physical addresses), for accesses to an external memory 200 via the cache memories 41 and 42, and accesses to the hardware peripherals. The TLB 30 is a buffer memory (of fixed size) containing the translations that have already been performed.

The processor core 10 here comprises a single context 11. Context is understood to mean a set of internal registers defining the state of the processor in relation to a thread of a process executing in the core 10.

Moreover, since the example concerns a processor with superscalar architecture, the core 10 comprises a plurality of execution units 12 that are adapted for performing the processing of the instructions in parallel with one another.

The context 11 comprises nonprivileged registers, that is to say ones that can be accessed by the process in user mode, and privileged registers, that is to say ones that can be accessed only by the OS in privileged mode. The nonprivileged registers comprise data registers 111 and a register 112 containing an instruction pointer (IP) which designates the place where the code of the current instruction of the context is stored in memory. The privileged registers comprise a register 121 containing a cue I_T_B called the base address of the interrupt table ("Interrupt-Table-Base"), as well in certain cases as a register 122 containing a cue MMU_T_B called the MMU table base address ("MMU-Table-Base") serving to calculate the translations of addresses for accessing the pages of the memory.

The content of the register 121, namely the cue I_T_B, is provided as input for the interrupt controller 20. The content of the register 122, namely the cue MMU_T_B, is provided as input to the MMU 70.

The content of the register 112, namely the pointer IP, is provided as input to an extraction unit 13 (or "Fetch Unit") which is responsible for extracting ("fetching") from the external memory 200 the data coding the current instruction, based on said IP pointer.

The data of the current instruction that are extracted by the unit 13 are provided as input to an instruction decoder 14. The latter carries out the decoding of the current instruction.

The decoded instructions are thereafter stored in a queue 15 which obeys a rule of the first in, first out type. The instructions are distributed, from the queue 15 in which they are stored in decoded form, between the various execution units 12 as a function of their availability. The execution units 12 also receive the data to be processed from the data register 111 of the context 11. The result of the operation executed by each unit is thereafter written either to one of these data registers, or to memory, or to a hardware peripheral register.

Such an architecture is said to be superscalar in the meaning that the core 10 comprises several execution units capable of executing instructions in parallel. It is said to be single-context in the meaning that the core 10 comprises just one context.

Figure 2:
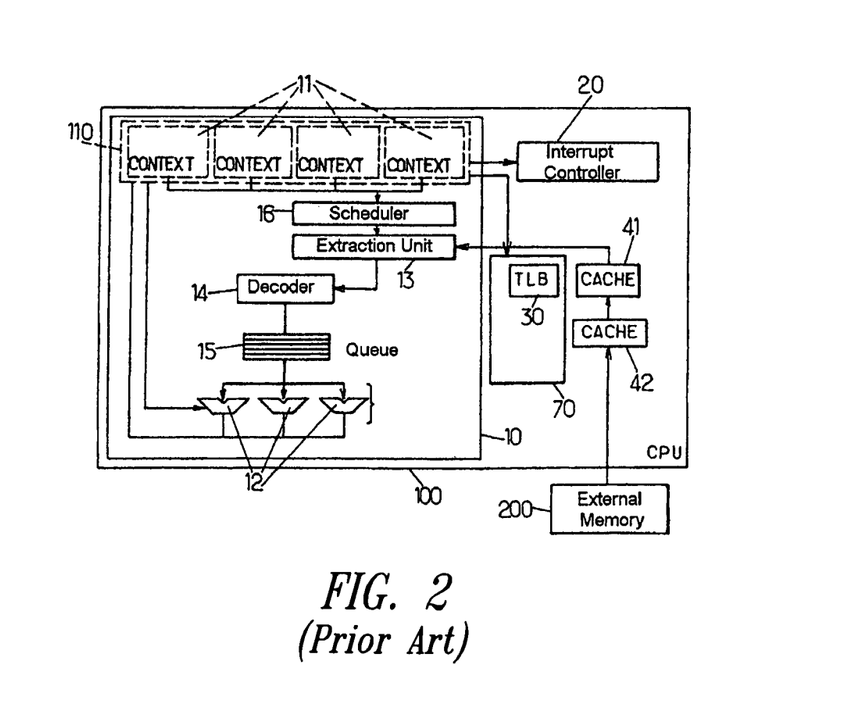
FIG. 2 is a block diagram illustrating an exemplary architecture of a multicontext superscalar processor according to the prior art.

Conversely, an architecture of which an example is given in FIG. 2 is said to be multicontext in so far as the core 10 of the processor 100 comprises a set of contexts 110, having a plurality of contexts 11 each of which is structurally and functionally identical to the context 11 described hereinabove with regard to the diagram of FIG. 1.

The registers 111 of each of the contexts 11 of the set 110 are coupled to the execution units 12 in the same manner as described previously. Likewise, the register 121 of each context 11 is coupled to the interrupt controller 20, and the register 122 of each context 11 is coupled to the MMU 70. On the other hand, the register 112 (containing the IP pointer) of each context 11 is coupled to the extraction unit 13 via an instruction scheduler 16. The function of this scheduler 16 is to select that one of the contexts 11 whose current instruction is dispatched to the execution units 12.

Such an architecture is said to be symmetric in the sense that each of the contexts 11 of the set 110 possesses the same prerogatives as the others. As a result, each context in privileged mode possesses control over all the resources of the system and hence over the other contexts even in their privileged mode. This is a drawback in applications where certain at least of the contexts are designed to form part of a secure domain. Specifically, if an OS is hacked into, then it is the entire system that falls under the control of this OS hacker. The consequence is that sensitive information processed in the context of a secure domain (for example a user's bank identification data) becomes accessible to the OS hacker and its applications.

Figure 3:
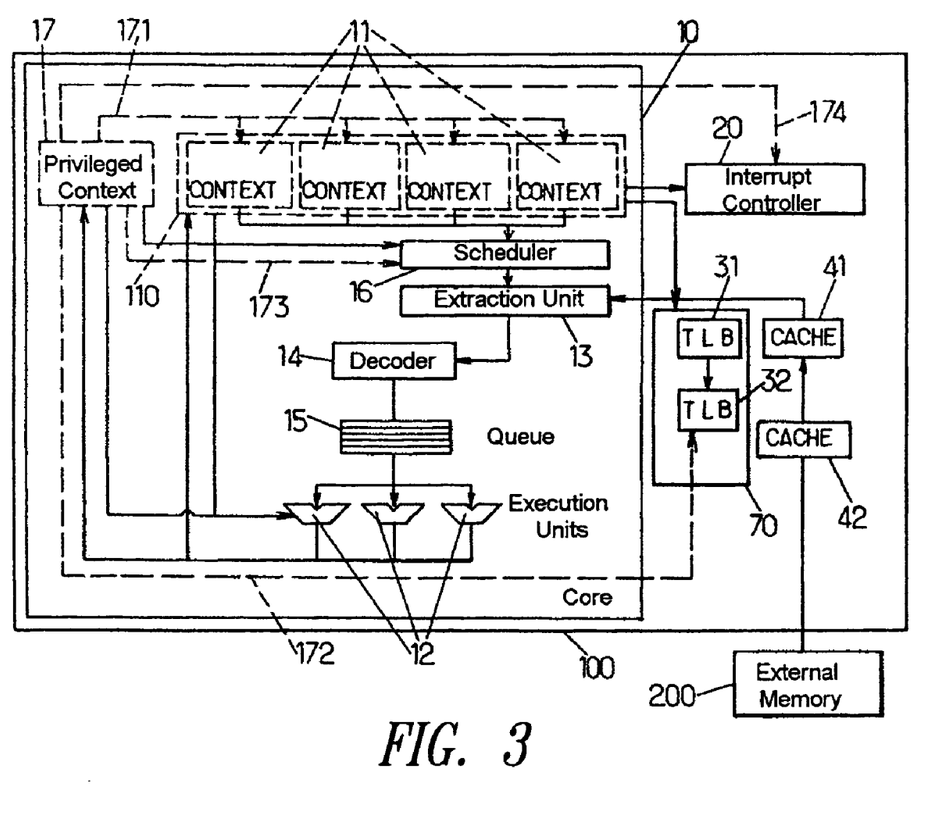
FIG. 3 is a block diagram illustrating an exemplary architecture of a multicontext superscalar processor according to the invention.

This is why the invention proposes another multicontext processor architecture, an example of which is illustrated by the block diagram of FIG. 3.

The simultaneous execution contexts here comprise a particular context 17 which makes it possible, preferably in the privileged mode of the OS, to restrict the use of the hardware resources of the processor by the other contexts. By convention, this particular context 17 is referred to as the privileged context, and the other execution contexts are referred to as nonprivileged contexts. By analogy with the architecture shown in FIG. 2, it is considered here that the nonprivileged contexts are the contexts 11 of the set 110 and the privileged contexts 17 is an extra context.

According to one embodiment, the privileged context 17 may command the nonprivileged contexts by reading to and/or writing from registers of the latter, this being symbolized in FIG. 3 by the broken arrow 171.

Figure 4:
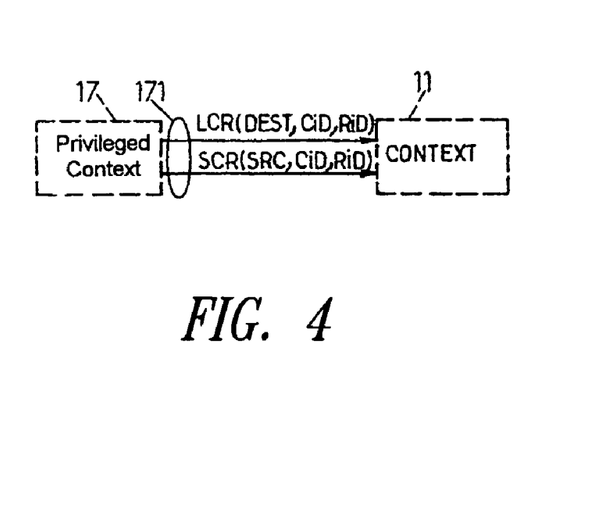
FIG. 4 is a diagram illustrating the principle of the command of the nonprivileged contexts by the privileged context according to the invention.

This command can be effected in practice by two instructions LCR ("Load Context Register") and SCR ("Store Context Register"), as is illustrated by the diagram of FIG. 4.

The two commands LCR and SCR are issued by the privileged context 17, and have as parameter a context identifier CID, as well as one (or more) register identifier(s).

The instruction LCR (DEST, CID, RID) enables for example the context 17 to read the content of the register 11 identified by the identifier RID from the context identified by the identifier CID and to write to a register or a memory area identified by the parameter DEST. Likewise, the instruction SCR (SRC, CID, RID) enables the register 17 to write to the register 11 identified by the identifier RID of the context identified by the identifier CID, the value specified by the parameter SRC which may denote a register or a memory area. Other parameters are conceivable, depending on the requirements of the application.

These commands enable the privileged context 17 to restrict access by the nonprivileged contexts to the hardware resources when these contexts execute a given process. It is thus possible to encapsulate certain contexts, form subgroups of contexts, which may be reserved respectively for the processing of specified processes, for example the processes of such or such an OS supported by the processor. Stated otherwise, it is possible to obtain a multiplexing of processes or even a multiplexing of several OSs between one or more execution contexts, under the command of the privileged context 17.

In order to strengthen the security in the processor, the asymmetric architecture according to the invention makes it possible to go further, by providing for the command by the privileged context 17 of the hardware resources of the processor that are used by the nonprivileged contexts 11. The hardware resources concerned are in particular the physical memory, the instruction scheduler and the interrupt controller. The various aspects of the invention will now be described in succession.

Physical Memory 200

In the physical memory, a memory space of variable size is allocated dynamically to each application program. More specifically, each application program has access to only part of the pages of the physical memory. These pages form a memory space (possibly discontinuous) which is addressed at the level of the memory bus by physical addresses, but which is known to the application program via an addressing space (in general continuous), the so-called virtual addressing space which the program accesses with virtual addresses. The virtual addressing space is specific to the application program. The relationship which links the virtual addresses in said addressing space and the physical addresses in the physical memory is stored in the form of a translation table, in a TLB. It is recalled that a TLB is essentially a buffer memory area (i.e., table) which stores the latest translation of addresses calculated by the MMU's table reloading unit.

In a known manner, each entry of the TLB, i.e., each row corresponding to a translation in the TLB comprises an addressing space identifier (or ASID, standing for "Address Space IDentifier") so as to distinguish identical virtual addresses in different addressing spaces. Each ASID is respectively associated, in a one-to-one manner, with a specified addressing space of the system.

The code of an OS, such as Windows® or Linux®, is designed in such a way as to have full control of the machine on which it executes, and in particular on the hardware elements of the MMU and therefore of the TLB.

The known TLBs are of two distinct types, which differ by their mode of walking through the tables of pages when the requested translation does not correspond to any entry (i.e., row) in the TLB, that is when it is not available in this buffer memory (one then speaks of a "TLB miss").

On the one hand there exist hardware-walked TLBs which comprise a logic unit (hardware unit) for walking through the memory page tables hardwarewise. An error is signaled to the OS only if the requested translation is not valid. For hardware-walked TLBs, the address of the page table where the walk begins is determined by the cue MMU_T_B contained in the register 122 of each context, which is a privileged register.

On the other hand there exist software-walked TLBs which signal this absence to the OS via an appropriate exception. The OS then walks through all the memory page tables to find the requested translation, then adds it as an extra entry in the TLB. For software-walked TLBs, the register 122 is unnecessary since the starting point of the walk through the page tables is stored in the data structures of the OS.

In the conventional architectures, the privileged mode of each context has access to all the physical addresses. There is therefore no isolation between the contexts. To protect the data stored in the physical memory, the privileged context is adapted to restrict access by the nonprivileged contexts to certain areas of the physical memory, by commanding the MMU. A mode of implementation of this command which relies on an original address translation technique will now be described.

Let us firstly note that, in one mode of implementation, each entry in the TLB is tagged by a context identifier (or CID). A CID makes it possible to identify in a one-to-one manner the context from which the current instruction originates, that is the instruction currently being processed by the extraction unit 13. The current CID is stored in a register that is updated hardwarewise, for example by the scheduler. To allow access to the memory, the requested address translation must relate to an address in the physical memory which the nonprivileged context (determined by the associated CIB) from which the current instruction originates is authorized to access. Stated otherwise, the requested address translation must be an entry of the TLB tagged by the CID associated with the nonprivileged context from which the current instruction originates, so that the requested translation is performed and hence that access to the memory is authorized.

For software-walked TLBs, for which the memory area containing the address translations is accessible by software, provision may further be made for the entries that are tagged with a CID other than that associated with the nonprivileged context from which the current instruction originates to be write-accessible only. Stated otherwise, in the case of disagreement between the tag of an entry corresponding to the requested translation and the CID of the nonprivileged context from which the requested translation originates, the data of the entry concerned may be overwritten by the writing of data corresponding to an added translation, but cannot be read since they belong to another context. Thus, the physical address and the access rights associated with a virtual address are not modifiable with a context other than the one which wrote the entry originally. This guarantees the absence of leaks of sensitive data between the contexts.

For TLBs that are walked through by hardware, nothing such as this is envisaged since the entries of the TLB cannot be manipulated directly by the software, but are reloaded by the hardware which, as described earlier, walks through the memory page tables from a base specific to each context, namely the cue MMU_T_B stored in the register 122 of the nonprivileged contexts.

Figure 5:
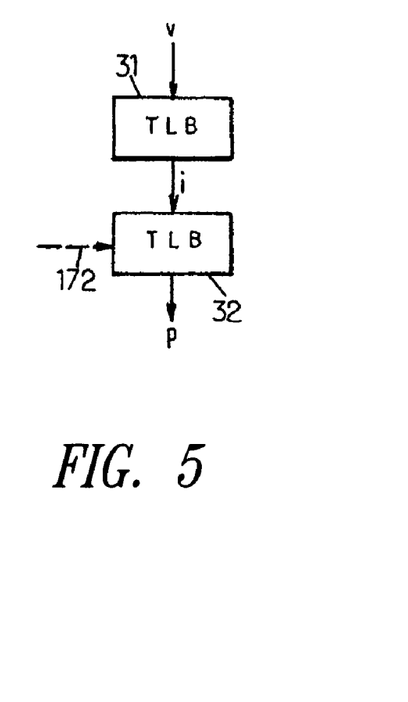
FIG. 5 is a diagram illustrating the principle of the two-level address conversion according to the invention.

To ensure protection of the memory, the invention proposes the implementation of a two-level address translation technique, which uses two TLBs each performing an address translation. This technique is illustrated by the diagram of FIG. 5.

A first TLB or upper TLB 31 receives a virtual address v from any one of the nonprivileged contexts 11 as input, and delivers an intermediate address i as output, which corresponds to the translation of the address v stored in the upper TLB 30. Functionally, the upper TLB 31 is used as a conventional TLB in the known architectures. Stated otherwise, from the point of view of the nonprivileged contexts 11, everything happens as if there were just one TLB, and as if the intermediate address i pointed directly to a page of the physical memory 200.

However, the MMU comprises a second TLB or lower TLB 32, which performs a second address translation. More specifically, the lower TLB 32 receives the intermediate address i as input and delivers a physical address p as output, which actually points to a memory page of the physical memory 200.

The upper TLB 31 and/or the lower TLB 32 may be software-walked TLBs. As a variant, one and/or the other may be hardware-walked TLBs.

Figure 6:
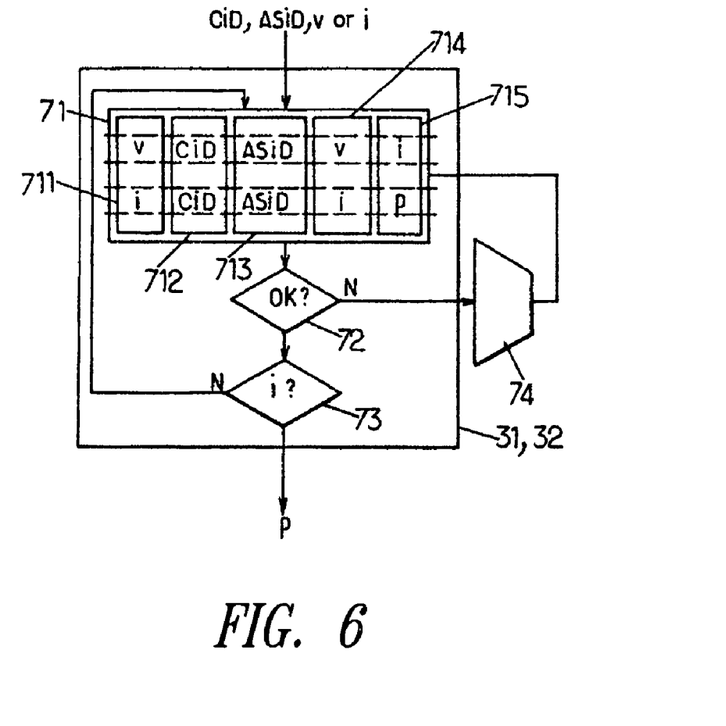
FIG. 6 is a functional diagram illustrating the embodiment of two nested hardware-walked memory page directories according to the invention.

In all cases, certain elements may be common to both TLBs 31 and 32, as will now be set forth in conjunction with the diagram of FIG. 6, which diagrammatically illustrates a possible embodiment of the two TLBs in the form of two nested hardware-walked TLBs.

In particular, the buffer memory 71 properly speaking may be common to both TLBs if a tag which indicates whether the starting address is virtual (v) or intermediate (i) is added to each entry of the table. For example, the table contains an extra column 711 containing said tag, in addition to the column 712 containing the CID, to the column 713 containing the ASID, to the column 714 containing the starting address v or i and to the column 715 containing the result address of the translation respectively i or p.

Likewise, a memory logic unit 72 which decides whether the requested conversion has been found in the buffer 71 ("TLB match") or not ("TLB miss"), may be common to both TLBs 31 and 32.

For the processing of the "TLB misses", a hardware unit for walking through the memory page tables 74 may also be common to both TLBs 31 and 32. Of course, if one and only one of the TLBs 31 and 32 is a software-walked TLB, the unit 74 is specific to the other TLB, which is hardware-walked by assumption. Moreover, if both TLBs 30 and 50 are software-walked, there is no hardware unit such as the unit 74, in either of the TLBs.

Finally, only in the case where both TLBs 31 and 32 are hardware-walked, a logic unit 73 decides, in the case of "TLB match", whether the starting address was an intermediate address. If it was not, then the translation was a first level translation (virtual address v to an intermediate address i) and a second level translation (intermediate address i to physical address p) is then requested with as address the address provided as input (intermediate address i) delivered as output of said first level translation. If it was, then this signifies that the requested translation was a second level translation, and the result thereof (physical address p) is delivered as output.

According to one aspect of the invention, the modifications in the lower TLB 32 are allowed only under the command of the privileged context 17. Stated otherwise, the privileged context 17 is adapted for configuring the lower TLB 32 in an exclusive manner. In this way, access to the memory of the nonprivileged contexts is restricted by the privileged context 17. This command is illustrated in FIG. 3 by the broken arrow 172.

Within the framework of processors using the concept of direct memory access (or DMA), one might fear that the protection of the memory provided by the two-level address translation technique described hereinabove could be short-circuited by an attack using a DMA request, a DMA controller using the physical addresses directly.

Figure 7:
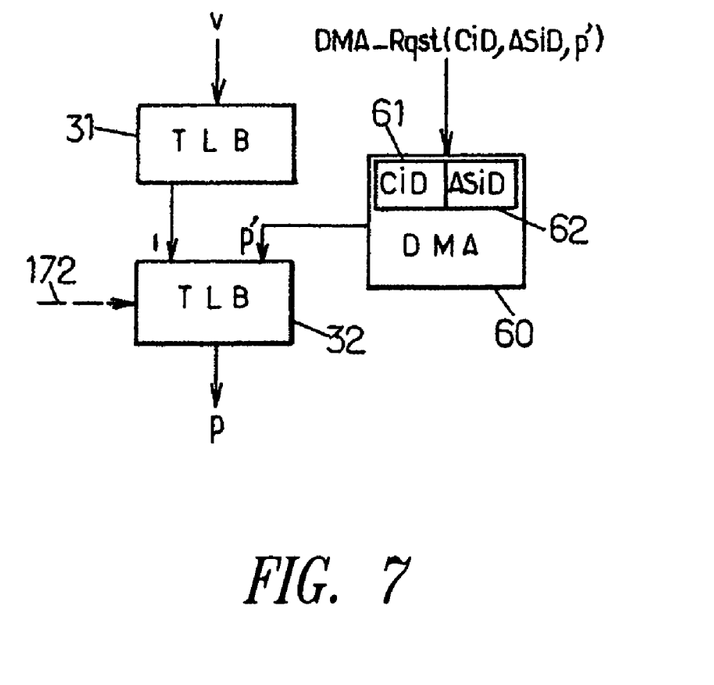
FIG. 7 is a diagram illustrating the application of the concept of direct memory access with a two-level addressing technique according to the invention.

This is why the implementation of the DMA controller function is preferably arranged between the implementation of the functions of the upper first level TLB 31 and of the lower TLB 32. This functional set-up is illustrated by the diagram of FIG. 7. In practice, of course, things are a little more complicated, but the person skilled in the art will be able to apply the teaching of the invention while taking account of the contingencies connected with the hardware and/or software implementation of these functions.

Thus, a request DMA_Rqst delivered to the DMA controller 60 forms the subject of an address translation by the lower TLB 32. It will be noted that, for this purpose, such a request DMA_Rqst will contain the context identifier CID as parameter, in addition to the identifier of the virtual memory space ASID and the address p' concerned in the request. The DMA controller 60 therefore comprises a register 61 for storing the identifier CID, and a register 62 for storing the identifier ASID.

From the point of view of the process from which the DMA request stems, the address p' that it provides, believed as it is to be a physical address, is therefore processed by the lower TLB 32 as an intermediate address. This remains totally transparent to the process. However, it results in the maintaining of the protection of the memory for a process using the DMA technology.

Instruction Scheduler 17

The function of the instruction scheduler 16 is to select instructions belonging to one of the streams of instructions of the nonprivileged contexts 11-and of the privileged context 17, and to dispatch them to the execution units 12 via the decoder 14 and the queue 15. For this purpose, it implements an appropriate scheduling algorithm. Several types of scheduling algorithms are known in the state of the art, for example algorithms of "Round Robin" type, block interleaving algorithms, scheduling algorithms based on a priority level, etc.

In order to ensure restriction of the use of the execution units 12 of the processor 10 by the nonprivileged contexts 11, the privileged context 17 is adapted to influence, at least to some extent, the running of the scheduling algorithm. This is represented symbolically by the broken arrow 173 in FIG. 3. Of course, the manner in which this influence is manifested in practice depends greatly on the type of scheduling algorithm concerned.

In one mode of implementation proposed here, the privileged context 17 is furnished with means for interrupting and with means for resuming the execution of certain at least of the nonprivileged contexts 11, individually, by commanding the instruction scheduler 16.

Figure 8:
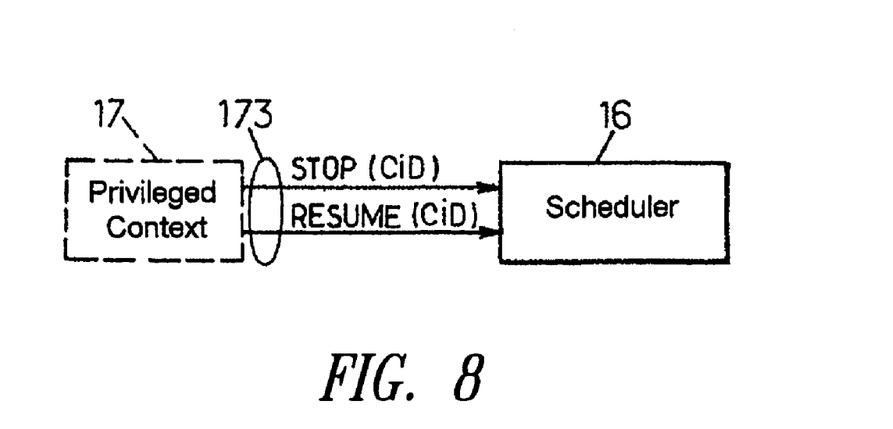
FIG. 8 is a diagram illustrating the principle of the command by the privileged context of the use of the execution units by the nonprivileged contexts according to the invention.

As is illustrated diagrammatically in FIG. 8, such means may be implemented in the form, respectively, of a stop instruction STOP and of a restart instruction RESUME, that are sent by the privileged context 17 to the instruction scheduler 16. These instructions have a context identifier CID as parameter.

In the case of a processor having only a nonprivileged context 11, the instruction scheduler 16 can be reduced to a logic unit which, on request, switches between the instruction stream originating from said nonprivileged context 11 and the instruction stream originating from the privileged context 17.

Provision may also be made for a means enabling the OS to deliberately interrupt the execution of a process in a nonprivileged context 11 and to request the toggling of the process to the privileged context 17 in a secure manner.

Such a means can be implemented in the form of an adapted interrupt request, which is added to the instruction set of the processor. With such a mechanism, communication between the contexts may be implemented. It will be noted that this interrupt request is functionally comparable to a secure-mode input instruction in an architecture with improved security.

Interrupt Controller 20

The function of the interrupt controller 20 is to demultiplex the interrupt requests originating from various sources, and to deliver them selectively to one (or more) context(s) of the processor for processing.

In a conventional multicontext architecture, that is to say a symmetric architecture, any of the contexts may be selected for this purpose. However, it is not satisfactory, from the security point of view, to apply this policy in an asymmetric multicontext architecture according to the invention.

Specifically, by virtue of this architecture, a subset of nonprivileged contexts 11 of the processor from among those of the set 110, may be grouped together and encapsulated by the OS executing in the privileged context 17 (see above). It follows that the delivering of an interrupt request to other nonprivileged contexts could bring about the leaking of sensitive information of said subset of nonprivileged contexts to the other nonprivileged contexts. At least, this may allow attacks by denial of service.

In order to alleviate these drawbacks, it is proposed that the interrupt controller 20 be slightly modified. This aspect of the invention will now be described in conjunction with the diagram of FIG. 9.

Figure 9:
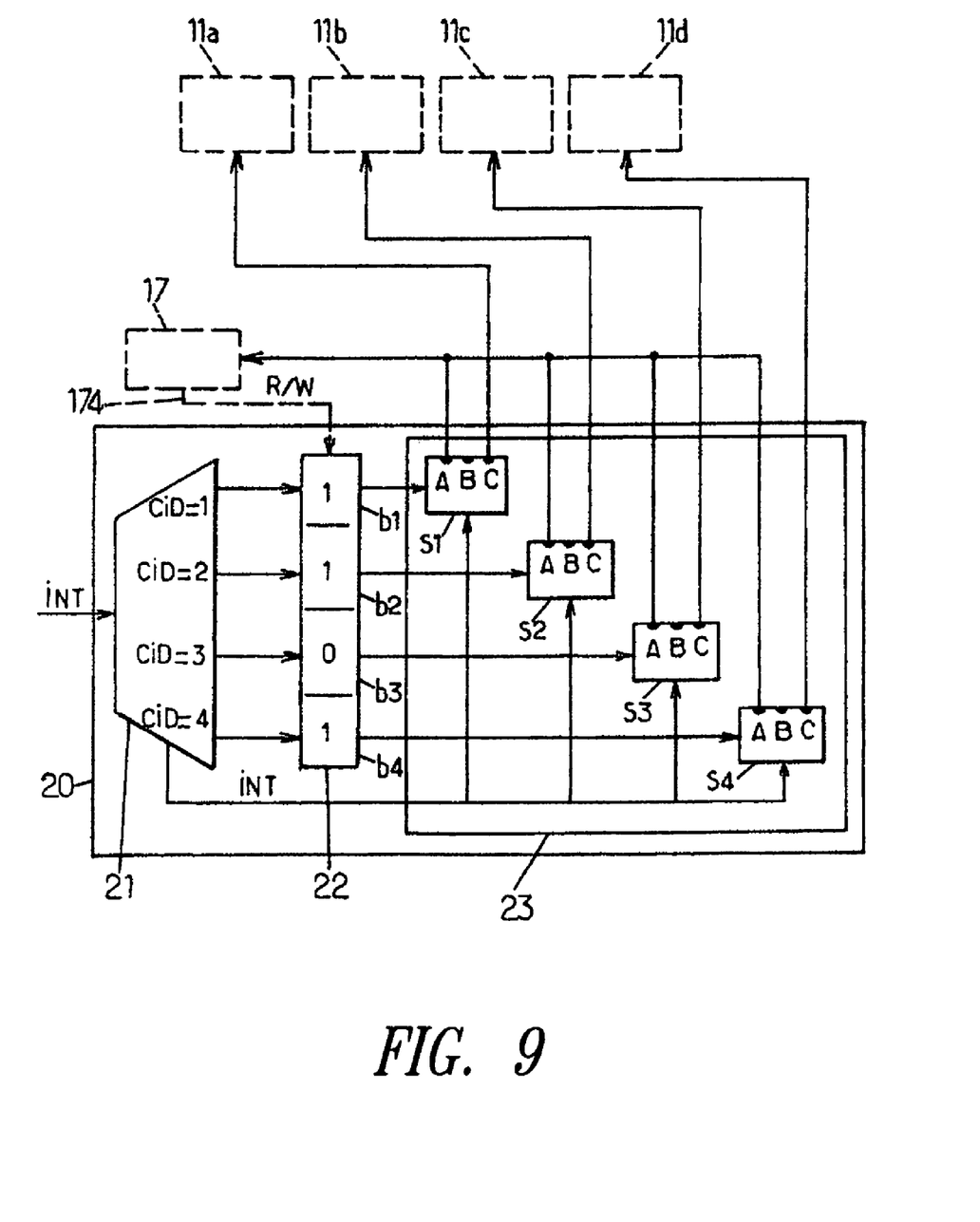
FIG. 9 is a diagram illustrating the principle of the command by the privileged context of the management of the interrupts according to the invention.

FIG. 9 shows an exemplary embodiment of the interrupt controller 20 in a particular case where the processor comprises four nonprivileged contexts, referenced 11a, 11b, 11c and 11d respectively. This example is readily generalized to other cases, where the processor comprises any number of nonprivileged contexts.

The controller 20 comprises, for each interrupt request, a register 22 with bits b1, b2, b3 and b4 respectively associated with each of the nonprivileged contexts 11a, 11b, 11c and 11d of the processor. For example, if a bit of a register 22 has the value 1, this signifies that the interrupt request INT corresponding to this register, may be delivered to the nonprivileged context associated with this bit. Conversely, the value 0 of a bit of the register 22 brings about the delivery of the INT interrupt request to the privileged context 17 instead of the nonprivileged context associated with this bit, so that the request is processed by said privileged context. Stated otherwise, the binary value of the bit commands the delivery (for processing) or otherwise of the interrupt INT to the associated nonprivileged context.

In an exemplary embodiment, the controller 20 comprises a demultiplexing unit 21 which implements the customary demultiplexing function of the controller 20, in a manner known per se. Instead of delivering the interrupt directly to one (or more) of the contexts 11a to 11d selected to process the interrupt, the demultiplexing unit 21 activates the register 22 corresponding to the interrupt request INT, so that the value of the bit of this register which is associated with said selected context(s) is delivered to a decoding logic unit 23.

In an exemplary embodiment in accordance with FIG. 9, the unit 23 comprises interrupters with three positions referenced S1, S2, S3 and S4, which are associated with the bits of the register 22 respectively b1, b2, b3 and b4 on the one hand, and with the nonprivileged contexts 11a, 11b, 11c and 11d of the processor on the other hand. Each interrupter receives as input the interrupt INT, which is provided to it by the demultiplexing unit 21. For example, these interrupters are embodied with the aid of three-state logic gates. In a deactivated state (for example high-impedance state), represented in the figure by the letter B, the interrupters do not transmit any data. In a first activated state, represented in the figure by the letter A, in which they are placed when the associated bit of the register 22 has the value 1, the interrupters authorize the transmission of the interrupt instruction INT to the associated nonprivileged context. In a second activated state, represented in the figure by the letter C, in which they are placed when the associated bit of the register 22 activated by the unit 21 has the value 0, the interrupters prevent the transmission of the interrupt INT to the nonprivileged context and force its transmission to the privileged context 17 of the processor.

Thus, in the example represented in FIG. 9 for which the bits b1, b2, b3 and b4 of the register have the values 1, 1, 0 and 1 respectively, the nonprivileged contexts 11a, 11b and 11d are authorized to process the interrupt INT if they are selected by the demultiplexing unit 21 of the interrupt controller 20, but not the nonprivileged context 11c.

The content of the registers 22 corresponding respectively to each interrupt request, that is the value of the bits b1, b2, b3, and b4 which they store, is read- and write-accessible by the nonprivileged context 17 only. This is symbolized in FIG. 3 by the broken arrow 174 linking these two entities. Thus, the register 22 allows the privileged context 17 to prevent selectively the delivery of the interrupt request to certain nonprivileged contexts of the processor 10, with the consequence here that it will process these interrupts itself. In this way, isolation between the nonprivileged contexts is ensured even as regards the processing of the interrupts.

It will be noted that other policies may be applied in respect of the processing of interrupts in case of nonauthorization of certain of the nonprivileged contexts, for example by providing for the selection by the unit 21 of an authorized nonprivileged context only.

The solution proposed here has the advantage however of simplicity since, with few extra logic elements, it avoids the need to modify the embodiment of the multiplexing unit 21 as compared with the known processor architectures.

It will be noted finally that, if the multicontext asymmetric architecture of a processor according to the invention has been described hereinabove within the framework of an application aimed at improving security in respect of the execution of application programs processing sensitive information, this architecture also finds other applications.

For example, it may be used for the embodiment of virtual machines supported by the hardware elements of a processor. Specifically, each nonprivileged context can be likened to an arrangement of the entire hardware resources of the processor, exactly like a virtual machine. In fact, the processor executes such a context directly. It follows that the privileged context according to the invention, which controls all the nonprivileged contexts, may be seen as a monitor of virtual machines in the processor. The instructions LCR and SCR presented above make it possible moreover to capture the instantaneous state of the virtual machine executed in a specified nonprivileged context, thereby allowing in particular the multiplexing of nonprivileged contexts between several virtual machines. Through the invention, the concept of virtualization of machines in a processor may therefore be implemented in a processor employing few extra hardware means.

Another exemplary application is the use of an unmodified "Workhorse" OS for systems based on a micro-kernel. Specifically, machines with an asymmetric multicontext architecture according to the invention may be used in such a way that an unmodified pre-existing OS is executed in a nonprivileged context while being fully controlled by a micro-kernel executed in the privileged context.

The invention claimed is:

1. A processor, comprising:
    at least one execution unit;
    an instruction scheduler connected to the at least one execution unit;
    an interrupt controller;
    a memory management circuit;
    at least two simultaneous execution contexts including:
        at least one nonprivileged execution context connected to the instruction scheduler and the interrupt controller and accessible in a user mode, the nonprivileged execution context comprising a first data register;
        at least one privileged execution context connected to the at least one nonprivileged execution context and accessible only by an operating system of the processor in a privileged mode, and further connected to the at least one execution unit, the instruction scheduler, and the interrupt controller, the privileged execution context comprising a second data register;
    wherein the privileged context is configured to use a demultiplexer to:
        restrict use of at least one of the instruction scheduler, interrupt controller, and memory management circuit by at least one non privileged context,
        control and operate the at least one nonprivileged contexts,
        isolate at least one of the nonprivileged contexts from other of the at least one nonprivileged contexts,
        control the at least one execution unit, the instruction scheduler, and the interrupt controller and exclusively access tables of memory pages in the memory management circuit.

2. The processor of claim 1, wherein the privileged context comprises a circuit that reads from or writes to registers of the other execution contexts.

3. The processor of claim 1, wherein the memory management circuit comprises two-level address translation means, having an upper directory of tables of memory pages for translating a virtual address provided as input into an intermediate address delivered as output, and a lower directory of tables of memory pages for translating an intermediate address provided as input into a physical address delivered as output, and wherein the privileged context comprises means for, in a privileged mode of the operating system, configuring said lower directory of tables of memory pages in an exclusive manner.

4. The processor of claim 3, wherein the upper directory of tables of memory pages and the lower directory of tables of memory pages share a common address translation table in which each entry is tagged by a cue indicating whether the input address is a virtual address or an intermediate address, a logic unit configured to decide whether a requested translation is available in said address translation table, and a hardware unit for walking through the memory page tables.

5. The processor of claim 3, further comprising a direct access controller for the memory that is operationally arranged between the upper directory of memory page tables and the lower directory of memory page tables.

6. The processor of claim 1, wherein the privileged context comprises a circuit to command the instruction scheduler, and for interrupting and resuming the execution of at least one of said other execution contexts by the execution unit.

7. The processor of claim 1, wherein the privileged context comprises a circuit to command of the interrupt controller preventing the delivery, for processing, of an interrupt instruction to one at least of said other execution contexts.

8. The processor of claim 7, wherein the interrupt controller comprises, for each interrupt request, a register having a bit associated with each of said other execution contexts, the binary value of said bit controlling the delivery or otherwise of said interrupt request to said associated context.

9. The processor of claim 8, wherein the binary value of said bit controls the selective delivery of said interrupt instruction to said associated context or to the privileged context.

10. The processor of claim 8, wherein the circuit to command of the interrupt controller of the privileged context comprise a circuit for exclusive reading from and writing to said register of the interrupt controller.

11. A method of managing a processor, the method comprising:
    the processor having hardware resources that include at least one execution unit, an instruction scheduler connected to the execution unit, an interrupt controller, a memory management circuit, and at least two simultaneous execution contexts including:
        at least one nonprivileged execution context connected to the instruction scheduler and the interrupt controller and accessible in a user mode, the nonprivileged execution context comprising a first data register;

at least one privileged execution context connected to the at least one nonprivileged execution context and accessible only by an operating system of the processor in a privileged mode, and further connected to the at least one execution unit, the instruction scheduler, and the interrupt controller, the privileged execution context comprising a second data register;

wherein the privileged context is configured to use a demultiplexer to:
 restrict use of at least one of the hardware resources by at least one nonprivileged context,
 control and operate the at least one nonprivileged contexts,
 isolate at least one of the nonprivileged contexts from other of the at least one nonprivileged contexts,
 control the execution unit, the instruction scheduler, and the interrupt controller and exclusively access tables of memory pages in the memory management circuit.

12. The method of claim 11, wherein the privileged context is further configured to provide for reading from and writing to the registers of the other execution contexts.

13. The method of claim 11, wherein the management of the memory comprises providing a two-level address translation having the translation of a virtual address provided as input into an intermediate address delivered as output of an upper directory of tables of memory pages, and the translation of an intermediate address provided as input into a physical address delivered as output of a lower directory of tables of memory pages, and wherein the privileged context is further provided to configure, in a privileged mode of the operating system, the lower directory of tables of memory pages in an exclusive manner.

14. The method of claim 13, wherein the upper directory of tables of memory pages and the lower directory of tables of memory pages are provided to share a common address translation table in which each entry is tagged by a cue indicating whether the input address is a virtual address or an intermediate address, and a logic unit deciding whether a requested translation is available in said address translation table, and a hardware unit for walking through the memory page tables.

15. The method of claim 13, comprising providing a direct access controller for the memory, and configuring said direct access controller for the memory to be operationally arranged between the upper directory of memory page tables and the lower directory of memory page tables.

16. The method of claim 12, wherein the privileged context is furthermore provided for commanding the instruction scheduler with an instruction for interrupting and an instruction for resuming the execution of at least one of said other execution contexts by the execution unit.

17. The method of claim 12, wherein the privileged context is furthermore provided for commanding the interrupt controller preventing the delivery to process an interrupt request to one at least of said other execution contexts.

18. The method of claim 17, comprising providing the interrupt controller for each interrupt request a register having a bit associated with each of said other execution contexts, the binary value of said bit controlling the delivery or otherwise of said interrupt request to said associated context.

19. The method of claim 18, wherein the binary value of said bit controls the selective delivery of said interrupt instruction to said associated context or to the privileged context.

20. The method of claim 18, wherein the command of the interrupt controller by the privileged context comprises reading exclusively from and the exclusive writing to said register of the interrupt controller.

21. The method of claim 11, comprising executing a process for manipulating information that is sensitive from the security point of view in the privileged context or in one of said other contexts which is encapsulated by virtue of the command by the privileged context.

22. An electronic apparatus, comprising:
a processor, the processor comprising:
 at least one execution unit, an instruction scheduler coupled to the at least one execution unit, an interrupt controller, a memory management circuit; and
 at least two simultaneous execution contexts that comprise at least one nonprivileged execution context, connected to the instruction scheduler and the interrupt controller and accessible in a user mode, the nonprivileged execution context comprising a first data register, and at least one privileged execution context connected to the at least one nonprivileged execution context and accessible only by an operating system of the processor in a privileged mode, and further connected to the at least one execution unit, the instruction scheduler, and the interrupt controller, the privileged execution context comprising a second data register,
wherein the privileged context is configured to use a demultiplexer to:
 control and operate the at least one nonprivileged contexts,
 isolate at least one of the nonprivileged contexts from other of the at least one nonprivileged contexts,
 restrict use of at least one of the instruction scheduler, interrupt controller, and memory management circuit by at least one nonprivileged context,
 control the execution unit, the instruction scheduler, and the interrupt controller and exclusively access tables of memory pages in the memory management circuit.

23. The processor; of claim 22, wherein the privileged context is configured to restrict the use of certain of the hardware resources by at least one nonprivileged context of the other execution contexts.

24. The processor of claim 23, wherein the privileged context comprises a circuit for reading from and writing to registers of the other execution contexts.

25. The processor of claim 23, wherein the privileged context comprises a circuit for commanding the instruction scheduler, including an interrupt circuit and a resume circuit to resume execution of at least one of the nonprivileged context of the other execution contexts by the execution unit.

26. A processor comprising:
 a plurality of simultaneous execution contexts comprising at least one nonprivileged context having registers that include at least one data register, and a privilege context having at least one data register and adapted to read from and write to the at least one nonprivileged context;
 a scheduler coupled to the plurality of execution contexts and to the at least one privileged context;
 an interrupt controller coupled to the plurality of execution contexts and to the at least one privileged context;
 an extraction unit having a first input coupled to an output of the scheduler, a second input coupled to a memory circuit, and an output coupled to a decoder;
 a queue having an input coupled to an output of the decoder and an output coupled to a plurality of execution units, the execution units each having an output coupled to the privileged context, and at least one of the execution units having an input coupled to an output of the privileged context, the execution units further having their outputs coupled to the plurality of execution contexts; and wherein the privileged context is configured to use a demultiplexer to:

read from and write to registers of the plurality of execution contexts, restrict the use of one or more of the interrupt controller, scheduler, extraction unit, memory circuit, decoder, queue, and execution units, control and operate the at least one non privileged context, isolate at least one of the non privileged contexts from other of the at least one nonprivileged contexts, and control the execution unit, the instruction scheduler, and the interrupt controller and exclusively access tables of memory pages in the memory management circuit.

27. The processor of claim 26, wherein the memory circuit comprises a memory management circuit having a two-level address translation circuit comprising an upper directory of tables of memory pages for translating a virtual address provided as input into an intermediate address delivered as output, and a lower directory of tables of memory pages for translating an intermediate address provided as input into a physical address delivered as output, and wherein the privileged context is configured in a privileged mode of the operating system for configuring the lower directory of tables of memory pages in an exclusive manner.

28. The processor of claim 27, wherein the upper directory of tables of memory pages and the lower directory of tables of memory pages share a common address translation table in which each entry is tagged by a cue that indicates whether the input address is a virtual address or an intermediate address, and further comprising a logic unit configured to determine whether a requested translation is available in the address translation table.

29. The apparatus of claim 22, wherein the privileged context is configured to restrict the use of certain of the hardware resources by at least one nonprivileged context of the other execution contexts.

30. The apparatus of claim 29, wherein the privileged context comprises a circuit for reading from and writing to registers of the other execution contexts.

* * * * *